(12) United States Patent
Hiraoka et al.

(10) Patent No.: US 9,700,030 B2
(45) Date of Patent: Jul. 11, 2017

(54) SPINNING REEL

(71) Applicant: Shimano Inc., Sakai, Osaka (JP)

(72) Inventors: Hirokazu Hiraoka, Osaka (JP); Yutaka Inoue, Osaka (JP)

(73) Assignee: Shimano Inc., Osaka (JP)

( * ) Notice: Subject to any disclaimer, the term of this patent is extended or adjusted under 35 U.S.C. 154(b) by 372 days.

(21) Appl. No.: 14/509,608

(22) Filed: Oct. 8, 2014

(65) Prior Publication Data

US 2015/0157000 A1    Jun. 11, 2015

(30) Foreign Application Priority Data

Dec. 10, 2013 (JP) ................... 2013-255169
Dec. 10, 2013 (JP) ................... 2013-255170
Dec. 10, 2013 (JP) ................... 2013-255171

(51) Int. Cl.
 *A01K 89/01* (2006.01)

(52) U.S. Cl.
 CPC .......... *A01K 89/0108* (2013.01); *A01K 89/01* (2013.01); *A01K 89/011221* (2015.05)

(58) Field of Classification Search
 CPC ............ A01K 89/01; A01K 89/011221; A01K 89/0117
 See application file for complete search history.

(56) References Cited

U.S. PATENT DOCUMENTS

| | | | | |
|---|---|---|---|---|
| 6,457,662 B1* | 10/2002 | Sato | ....................... | A01K 89/01 242/247 |
| 2008/0149750 A1* | 6/2008 | Kitajima | ................ | A01K 89/01 242/224 |
| 2011/0174909 A1* | 7/2011 | Shibata | .................. | A01K 89/01 242/230 |
| 2011/0180646 A1* | 7/2011 | Hiraoka | ............... | A01K 89/006 242/241 |
| 2013/0206889 A1* | 8/2013 | Ochiai | ................... | A01K 89/00 242/322 |

FOREIGN PATENT DOCUMENTS

| | | |
|---|---|---|
| EP | 1 068 800 A2 | 1/2001 |
| EP | 2 625 954 A1 | 8/2013 |
| JP | 2000-83533 A | 3/2000 |
| JP | 2012-110293 A | 6/2012 |

OTHER PUBLICATIONS

European Search Report of corresponding EP Application No. 14 19 6887.5 dated Apr. 23, 2015.

* cited by examiner

*Primary Examiner* — Emmanuel M Marcelo
(74) *Attorney, Agent, or Firm* — Global IP Counselors, LLP (57) ABSTRACT

A first seal member is disposed forward of a one-way clutch so as to prevent water intrusion into the one-way clutch. A second seal member is disposed forward of the first seal member so as to prevent water intrusion into the one-way clutch. Further, the second seal member has a first inner peripheral surface disposed with a gap from an outer peripheral surface of a tubular portion. The first inner peripheral surface facing the outer peripheral surface of a tubular portion. At least either of the first inner peripheral surface and the outer peripheral surface of the tubular portion has water-repellent properties.

18 Claims, 6 Drawing Sheets

SPINNING REEL

CROSS-REFERENCE TO RELATED APPLICATIONS

This application claims priority to Japanese Patent Applications Nos. 2013-255169, 2013-255170 and 2013-255171, respectively filed on Dec. 10, 2013, the entirety of which are hereby incorporated by reference in their entirety.

BACKGROUND

Field of the Invention

The present invention relates to a spinning reel.

Background Information

A spinning reel includes a rotor and a spool and is configured to wind a fishing line onto the spool by rotating the rotor. The spinning reel further includes a one-way clutch for preventing the rotor from rotating in a reverse direction, i.e., a fishing-line releasing direction (see e.g., Japan. Laid-open. Patent Application Publication No. JP-A-2000-83533).

In detail, the rotor is configured to unitarily rotate with a pinion gear. On the other hand, the one-way clutch is configured to transmit rotation in one direction between a reel body and the pinion gear. In attempting to rotate the pinion gear in the fishing-line releasing direction, the one-way clutch is configured to transmit rotation between the pinion gear and the reel body. As a result, the pinion gear and the rotor are prevented from rotating in the fishing-line releasing direction. Contrarily, in rotating the pinion gear in a fishing-line winding direction, the one-way clutch is configured to block transmission. of rotation between the pinion gear and the reel body. As a result, the pinion gear and the rotor are allowed to rotate in the fishing-line winding direction.

If water or so forth intrudes into the one-way clutch structured as described above, various problems can occur. For example, rotation of the one-way clutch can become rough, and this roughness can prevent the rotor from smoothly rotating in the fishing-line winding direction Further or alternatively slipping occurs within the one-way clutch, and this slipping makes it difficult for the one-way clutch to sufficiently prevent reverse rotation of the rotor.

SUMMARY

It is an object of the present invention to reliably prevent water intrusion into a one-way clutch of a spinning reel.

A spinning reel according to an aspect of the present invention relates to a spinning reel configured to forwardly reel out a fishing line. The spinning reel includes a reel body, a spool shaft, a rotary member, a one-way clutch, a first seal member and a second seal member. The spool shaft is mounted to the reel body. The rotary member include a pinion gear. The pinion gear is mounted to the reel body and is disposed so as to be rotatable about the spool shaft. The one-way clutch is configured to transmit rotation in one direction between the reel body and the pinion gear. The first seal member is disposed forward of the one-way clutch so as to prevent water intrusion into the one-way clutch. The second seal member is disposed forward of the first seal member so as to prevent water intrusion into the one-way clutch. Further, the second seal member has a first inner peripheral surface. The first inner peripheral surface is disposed with a gap from an outer peripheral surface of the rotary member. The first inner peripheral surface faces an outer peripheral surface of the rotary member. At least one of the first inner peripheral surface and the outer peripheral surface of the rotary member has water-repellent properties.

According to the structure, the second seal member as well as the first seal member prevents water intrusion into the one-way clutch. Hence, water intrusion into the one-way clutch can be more reliably prevented. Further, the first inner peripheral surface of the second seal member is disposed with a gap from the outer peripheral surface of the rotary member. Hence, the rotary member is smoothly rotatable without being hindered from rotating by the second seal member. Further, at least one of the first inner peripheral surface of the second seal member and the outer peripheral surface of the rotary member has water-repellent properties. Hence, it is possible to inhibit intrusion of water or so forth into the one-way clutch through the clearance produced between the first inner peripheral surface of the second seal member and the outer peripheral surface of the rotary member.

The rotary member preferably includes a tubular portion configured to be unitarily rotated with the pinion gear. Further, an outer peripheral surface of the tubular portion preferably faces the first inner peripheral surface. Yet further, at least one of the outer peripheral surface of the tubular portion and the first inner peripheral surface preferably has water-repellent properties.

The first seal member preferably has a second inner peripheral surface disposed with a gap from the outer peripheral surface of the rotary member. The second inner peripheral surface faces the outer peripheral surface of the rotary member. Further, at least one of the second inner peripheral surface and the outer peripheral surface of the rotary member preferably has water-repellent properties. According to the structure, the second inner peripheral surface of the first seal member is disposed with a gap from the outer peripheral surface of the rotary member. Hence, the rotary member is smoothly rotatable without being hindered from rotating by the first seal member. Further, at least one of the second inner peripheral surface of the first seal member and the outer peripheral surface of the rotary member has water-repellent properties. Hence, it is possible to inhibit intrusion of water or so forth into the one-way clutch through the clearance between the second inner peripheral surface of the first seal member and the outer peripheral surface of the rotary member.

A first boundary region between the second inner peripheral surface of the first seal member and the outer peripheral surface of the rotary member is preferably located in a different radial position from a second boundary region between the first inner peripheral surface and the outer peripheral surface of the rotary member.

The first boundary region is preferably located radially inward of the second boundary region.

The first inner peripheral surface preferably has an axial length greater than a distance between the first inner peripheral surface and the outer peripheral surface of the rotary member.

The first seal member preferably has an annular shape. Further, the first seal member preferably has a first lip part with a thickness gradually reducing to an inner peripheral side.

The first seal member may include a second lip part with a thickness gradually reducing to the inner peripheral side.

The spinning reel preferably further includes an accommodation member. The accommodation member has an accommodation space opened forward. Further, the accommodation member is fixed to the reel body. The one-way clutch is disposed within the accommodation space.

The accommodation member may be integrally formed with the reel body.

The spinning reel preferably further includes a lid member. The lid member has a third inner peripheral surface disposed with a gap from the outer peripheral surface of the rotary member. The third inner peripheral surface faces the outer peripheral surface of the rotary member. The lid member is disposed forward of the accommodation member. Further, the first seal member is preferably configured to seal the gap between the lid member and the rotary member.

The second seal member preferably has a protruding part protruding forward. The protruding part is disposed on an entire circumference of an inner peripheral end of the second seal member. According to the present structure, water intrusion into the first seal member can be prevented by the protruding part.

The second seal member is preferably configured to press the first seal member from the front.

The second seal member preferably has a first facing surface. The first facing surface extends in a different direction from the first inner peripheral surface. The first facing surface disposed with a gap from the rotary member. The first facing surface faces the rotary member. Here, the first inner peripheral surface and the first facing surface extend in different directions from each other. Thus, a first clearance defined by the rotary member and the first inner peripheral surface and a second clearance defined by the rotary member and the first facing surface extend in different directions from each other. As a result, it is possible to inhibit intrusion of water or so forth into the one-way clutch through the first and second clearances.

The first inner peripheral surface preferably extends along a rotary axis direction of rotary member. Further, the first facing surface preferably extends along a radial direction of the rotary member. Thus, a so-called labyrinth structure is formed by the first clearance between the first inner per surface and the rotary member and the second clearance between the first facing surface and the rotary member. Intrusion of water or so forth into the one-way clutch can be prevented by the labyrinth structure.

The first facing surface is preferably formed by a front surface of an inner peripheral end of the second seal member. The first facing surface is preferably disposed with a gap from a rear surface of the rotary member. The first facing surface faces a rear surface of the rotary member.

The second seal member preferably has a second facing surface extending in a different direction from the first facing surface.

The second facing surface preferably extends in a rotary axis direction of the rotary member.

Overall, according to the present invention, water intrusion into a one-way clutch of a spinning reel can be reliably prevented.

BRIEF DESCRIPTION OF THE DRAWINGS

Referring now to the attached drawings which form a part of this original disclosure.

DETAILED DESCRIPTION OF EMBODIMENTS

Figure 1:
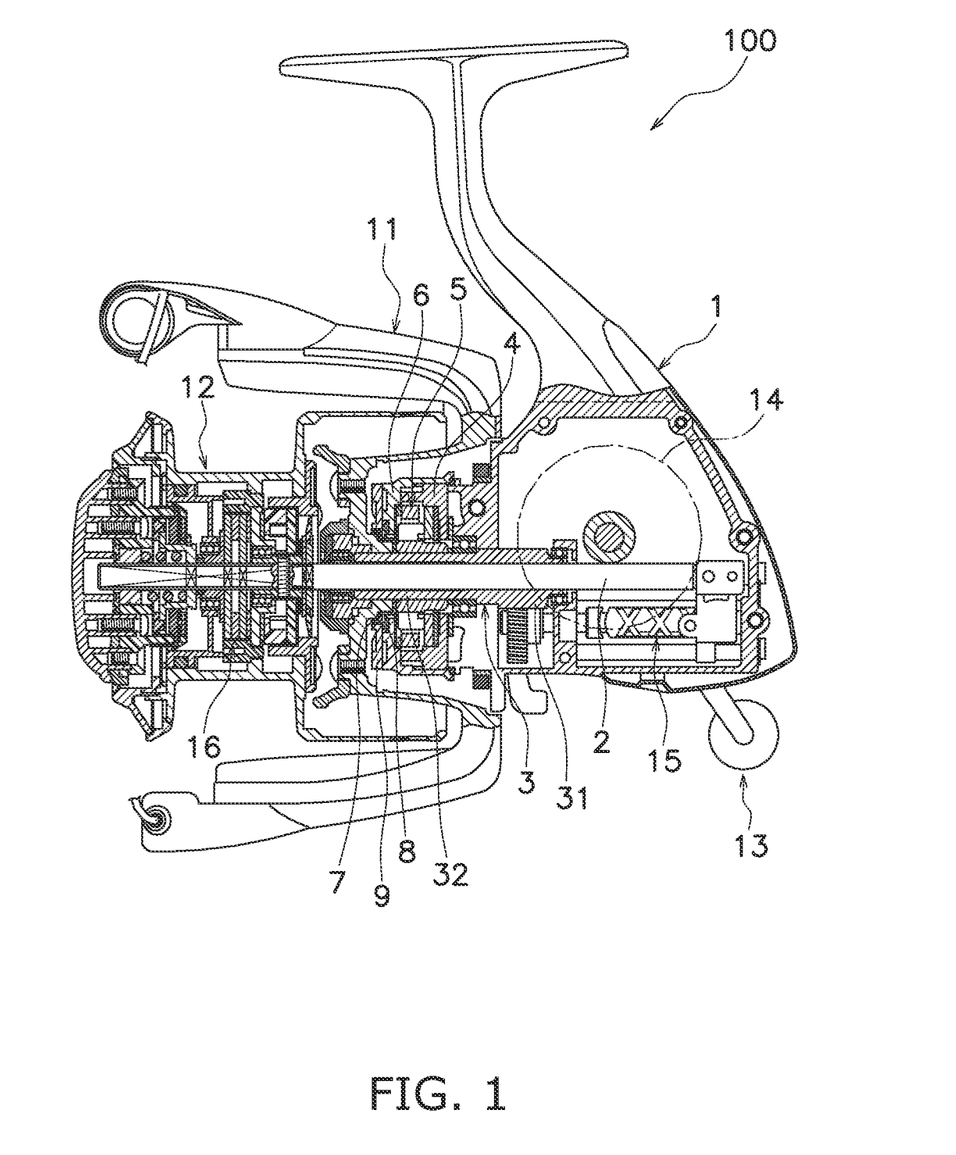
FIG. 1 is a cross-sectional view of a spinning reel.

With reference to the attached drawings, explanation will be hereinafter made for a spinning reel according to an exemplary embodiment of the present invention. FIG. 1 is a cross-sectional view of a spinning reel 100. It should be noted that in the following explanation, the term "axial direction" refers to an extending direction of a spool shaft 2; the term "radial direction" refers to a radial direction of a notional circle about the spool shaft 2; and the term "circumferential direction" refers to a circumferential direction of the notional circle about the spool shaft 2.

As illustrated in FIG. 1, the spinning reel 100 is configured to reel out a fishing line to the forward direction (leftward in FIG. 1). The spinning reel 100 includes a reel body 1, the spool shaft 2, a pinion gear 3, an accommodation member 4, a one-way clutch 5, a lid member 6, a tubular portion 7, a first seal member 8 and a second seal member 9. It should be noted that a rotary member of the present invention includes the pinion gear 3 and the tubular portion 7. The spinning reel 100 further includes a rotor 11, a spool 12 and a handle The reel body 1 has an internal space and accommodates a variety of mechanisms in the internal space. For example, a drive gear 14 and an oscillating mechanism 15 are accommodated within the reel body 1. Further, the handle 13 is rotatably attached to the lateral surface of the reel body 1.

The drive gear 14 is configured to be rotated in conjunction with rotation of the handle 13. The drive gear 14 is a face gear and is meshed with a gear part 31 of the pinion gear 3. The oscillating mechanism 15 is a mechanism configured to reciprocate the spool shaft 2 in the axial direction.

The spool shaft 2 is mounted to the reel body 1. When described in detail, the spool shaft 2 forwardly extends from the interior of the reel body 1. The spool shaft 2 is configured to be reciprocated in the back-and-forth direction in conjunction with rotation of the handle 13. When described in detail, the rotation of the handle 13 reciprocates the spool shaft 2 in the back-and-forth direction through the drive gear 14 and the oscillating mechanism 15.

The spool 12 is a member that the fishing line is wound thereabout. The spool 12 is mounted to the tip of the spool shaft 2 through a drag mechanism 16. The spool 12 is configured to be unitarily reciprocated with the spool shaft 2 in the back-and-forth direction.

The pinion gear 3 is mounted to the reel body 1. When described in detail, the pinion gear 3 forwardly extends from the interior of the reel body 1. The pinion gear 3 is disposed so as to be rotatable about the spool shaft 2. The pinion gear 3 has a tubular shape and enables the spool shaft 2 to extend through the inside of the pinion gear 3. It should be noted that the pinion gear 3 is supported by the reel body 1 through a plurality of bearings such that the inner peripheral surface of the pinion gear 3 and the outer peripheral surface of the spool shaft 2 are prevented contacting each other.

The pinion gear 3 has the gear part 31 and an attachment part 32. The gear part 31 is located in the rear part of the pinion gear 3 and meshes with the drive gear 14. The attachment part 32 is located in the front part of the pinion gear 3 and enables various members to be attached thereto.

Figure 2:
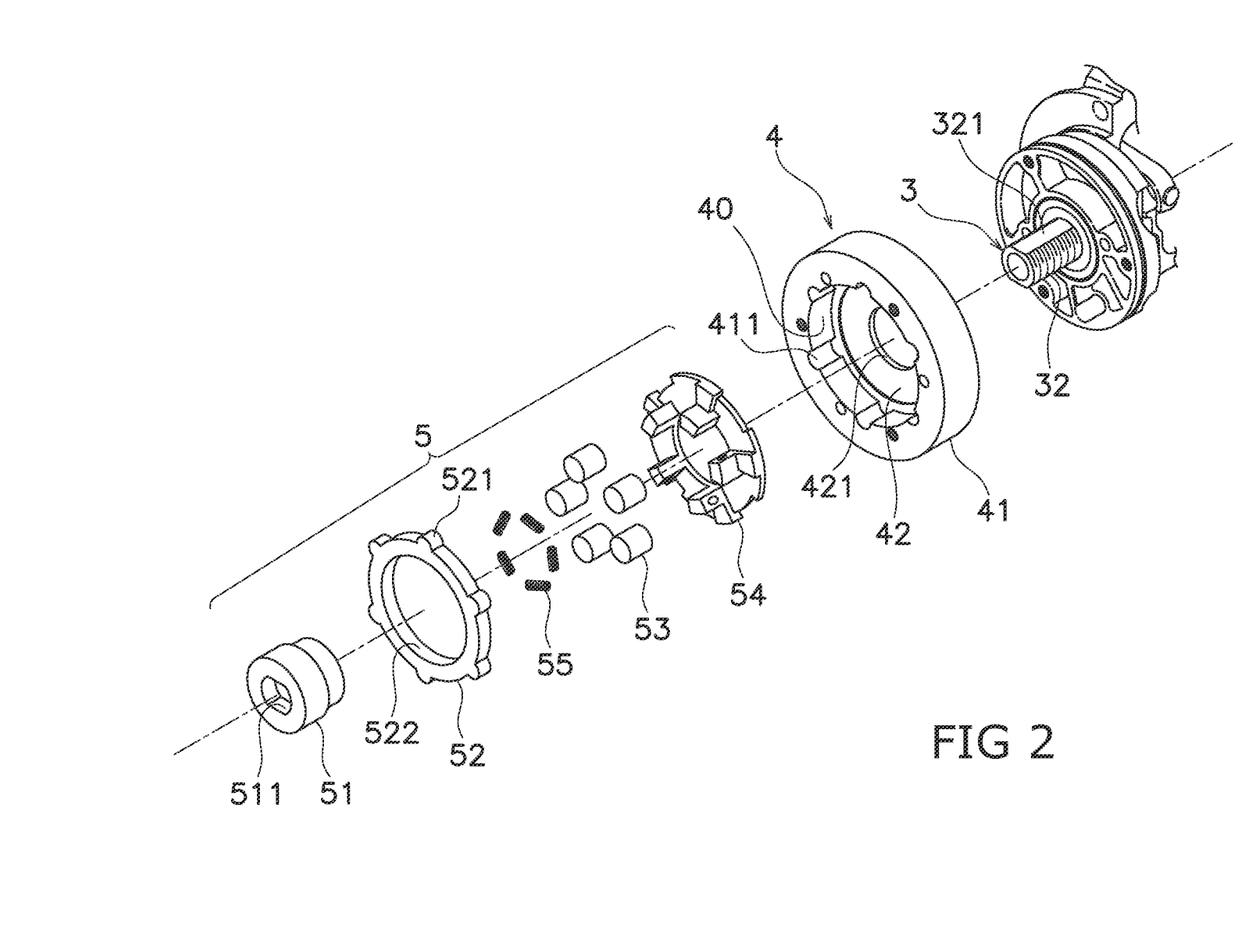
FIG. 2 is an exploded view of respective members disposed forward of a reel body.

FIG. 2 is an exploded view of the respective members disposed forward of the reel body 1. As illustrated in FIG. 2, the attachment part 32 of the pinion gear 3 has a cylindrical shape and has a pair of flat facets 321 on the outer peripheral surface thereof. The flat facets 321 respectively extend in the axial direction and are parallel to each other.

As illustrated in FIG. 1, the rotor 11 is a member for winding the fishing line about the spool 12. The rotor 11 is fixed to the pinion gear 3 and is configured to be unitarily rotated therewith. In other words, the rotor 11 is non-rotatable relatively to the pinion gear 3.

Figure 3:
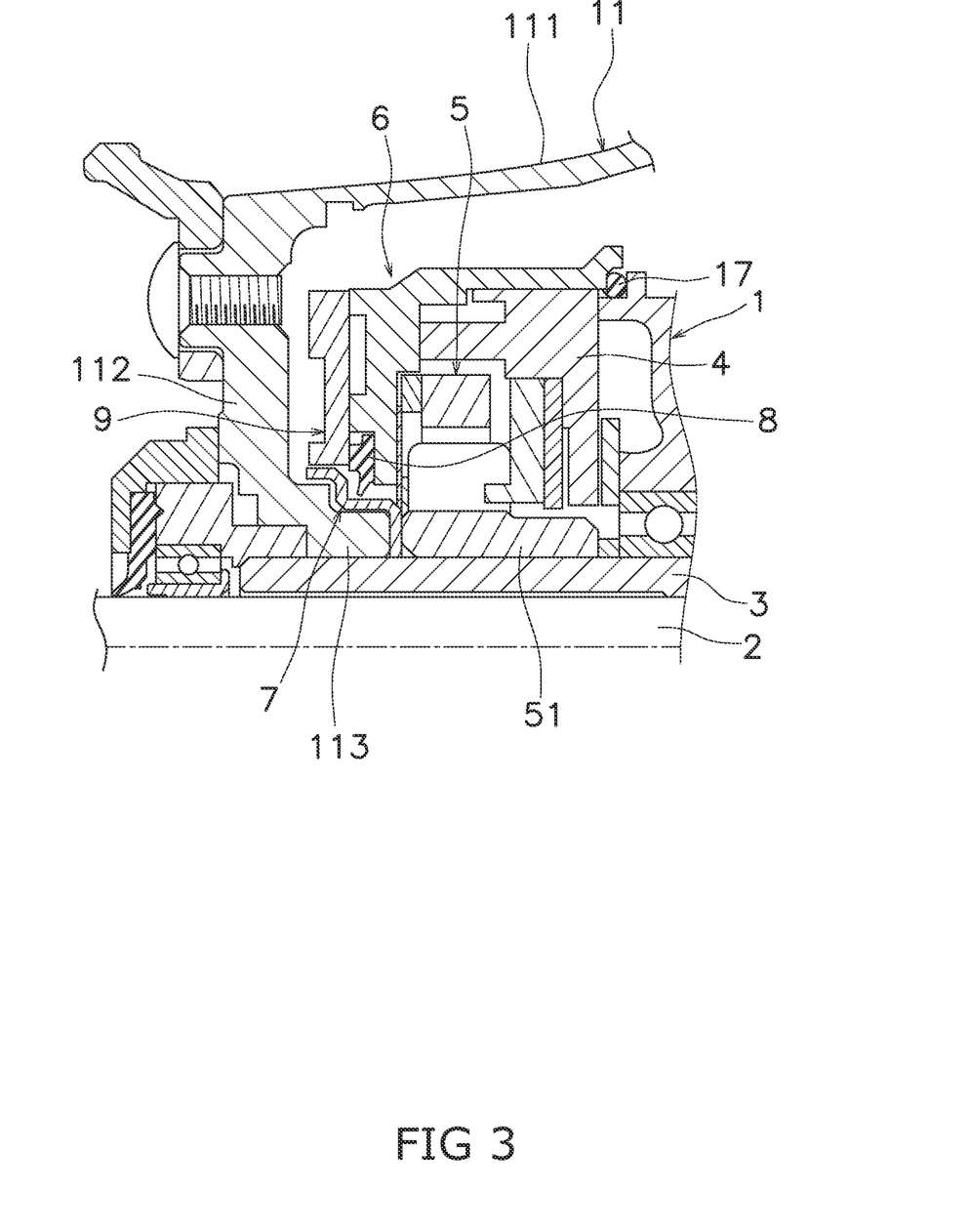
FIG. 3 is an enlarged cross-sectional view of the spinning reel.

FIG. 3 is an enlarged cross-sectional view of the spinning reel 100. As illustrated in FIG. 3, the rotor 11 has a cylindrical part 111, a wall part 112 and a boss part 2.13. These parts are integrally farmed as a single member.

The cylindrical part 111 is a cylindrical member and has an accommodation space in the interior thereof. The wall part. 112 has a circular disc shape and has an operating in the center thereof. The outer peripheral surface of the wall part 112 is continued to the inner peripheral surface of the cylindrical, cal part 111. The boss part 113 backwardly extends from the inner peripheral end of the wall part 112. The boss part 113 is attached to the attachment part. 32 of the pinion gear 3. As a result, the rotor 11 is unitarily rotated with the pinion. gear 3. When described in detail, the through hole of the boss part 113 has the same shape as the attachment part 32 of the pinion. gear 3 in a front view. When the attachment part 32 of the pinion gear 3 is fitted into the through hole of the boss part 113, the boss part 113 is attached to the pinion gear 3.

As illustrated in FIGS. 1 and 2, the accommodation member 4 as disposed forward of the reel body 1 and is non-rotatable about the spool shaft 2. Specifically, the accommodation member 4 is fixed to the reel body 1 by screw members or so forth.

As illustrated in FIG. 2, the accommodation member 4 has an accommodation space 40 opened in a forward direction. When described in detail, the accommodation member 4 has a cylindrical part 41 and a rear plate 42. The cylindrical part 41 has a cylindrical shape and has a plurality of recesses 411 on the inner peripheral surface thereof. The rear plate 42 closes the rear end surface of the cylindrical part 41. The rear plate 42 has an opening 421 in the center thereof and enables the pinion gear 3 to penetrate through the opening 421.

As illustrated in FIGS. 1 and 2, the one-way clutch 5 is disposed within the accommodation member 4 fixed to the reel body 1. The one-way clutch 5 is configured to transmit rotation in one direction between the pinion gear 3 and the accommodation member 4. In other words, the one-way clutch 5 is configured to transmit rotation in one direction. between the reel body 1 and the pinion gear 3.

Specifically, when the pinion gear 3 is going to rotate in the fishing-line releasing direction, the one-way clutch 5 is configured to transmit rotation between the reel body 1 and the pinion gear 3. As a result, the pinion gear 3 and the rotor 11 are prevented from rotating in the fishing line releasing direction. Contrarily, when the pinion gear 3 rotates in the fishing-line winding direction, the one-way clutch 5 is configured not to transmit rotation between the reel body 1 and the pinion gear 3. As a result, the pinion gear 3 and the rotor 11 are allowed to rotate in the fishing-line winding direction.

As illustrated in FIG. 2, the one-way clutch 5 is a roller type one-way clutch and includes an inner race 51, an outer race 52, a plurality of rollers 53, a holding member 54 and a plurality of urging members 55.

The inner race 51 is attached to the attachment part 32 of the pinion gear 3. As a result, the inner race 51 is unitarily rotated with the pinion gear 3. In other words, the inner race 51 and the pinion gear 3 are non-rotatable relatively to each other. When described in detail, the inner race 51 has a through hole 511 that has roughly the same shape as the attachment part 32 of the pinion gear 3 from a front view. As a result, the attachment part 32 of the pinion gear 3 is fitted into the through hole 511 of the inner race 51.

The outer race 52 has a roughly cylindrical shape and has a plurality of protrusions 521 on the outer peripheral surface thereof. The protrusions 521 of the outer race 52 are respectively engaged with the recesses 411 of the accommodation member 4. With this structure, the outer race 52 is prevented from rotating relative to the accommodation member 4. In other words, the outer race 52 is non-rotatable about the spool shaft 2. The outer race 52 has a cam surface 522.

The rollers 53 are respectively disposed between the inner race 51 and the outer race 52. Further, the rollers 53 are respectively held by the holding member 54. It should be noted that the urging members 55 are respectively disposed between the rollers 53 and the holding member 54. The urging members 55 respectively urge the rollers 53 in the circumferential direction.

Figure 4:
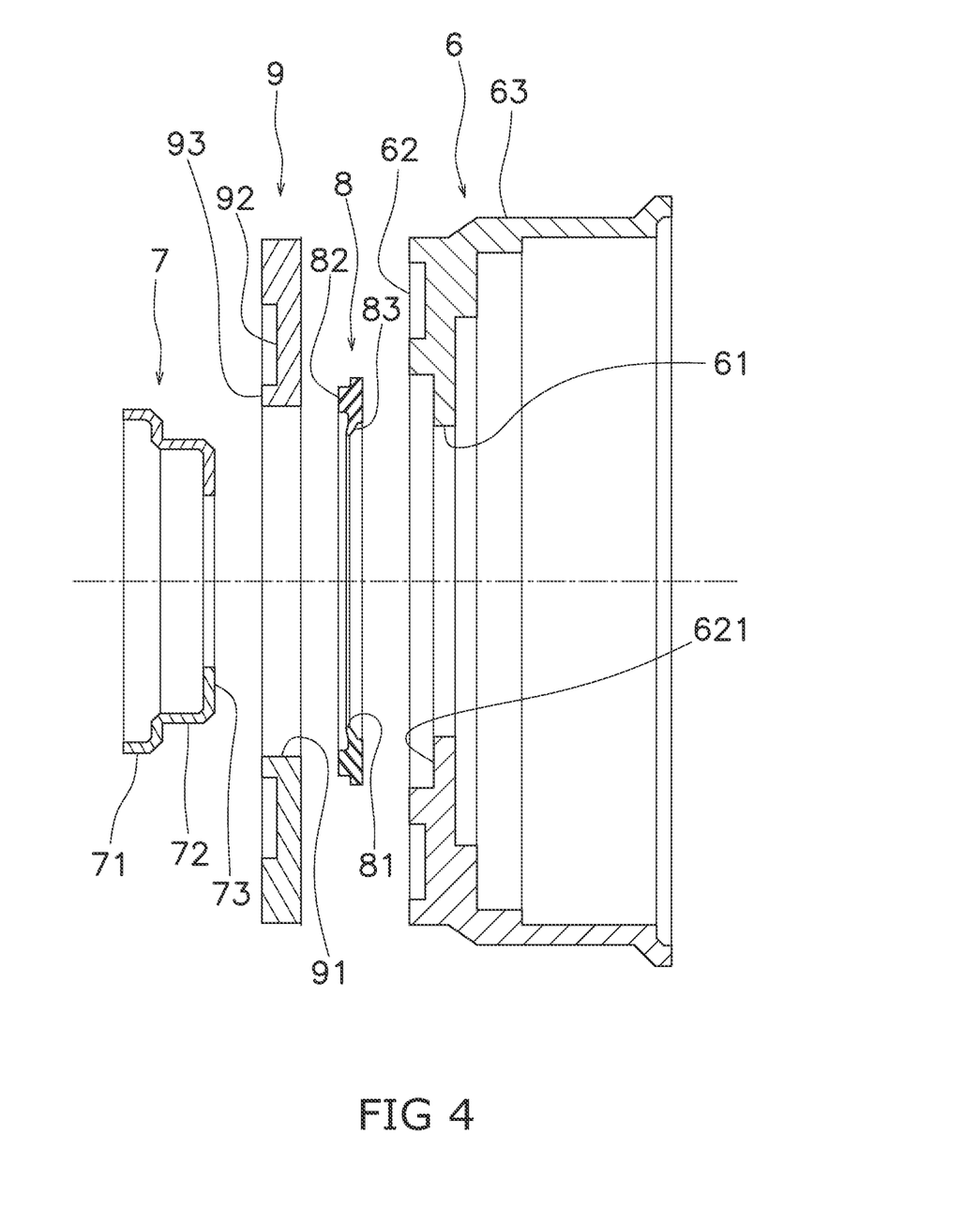
FIG. 4 is an exploded view of a seal structure.

As illustrated in FIG. 3, the lid member 6 is disposed forward of the accommodation member 4. The lid member 6 is configured to define the front side of the accommodation space 40. The lid member 6 is non-rotatable about the spool shaft 2. For example, the lid member 6 is fixed to the reel body 1 by screw members or so forth. As illustrated in FIG. 4, the lid member 6 has a third inner peripheral surface 61. The third inner peripheral surface 61 faces the outer peripheral surface of the tubular portion 7 with a gap.

The lid member 6 has a lid part 62 and a cylindrical part 63. The lid part 62 is formed so as to define the front side of the accommodation space 40. The lid part 62 has a disc shape and has an opening in the center thereof. The inner peripheral surface of the opening of the lid part 62 corresponds to the aforementioned third inner peripheral surface 61.

The cylindrical part 63 has a cylindrical shape and backwardly extends from the outer peripheral end of the lid part 62. The inner peripheral surface of the cylindrical part 63 is contacted to the outer peripheral surface of the accommodation member 4. The cylindrical part 63 extends to the front end of the reel body 1. An O-ring 17 is interposed between the rear end of the cylindrical part 63 and the front end of the reel body 1 (see FIG. 3).

As illustrated in FIG. 3, the tubular portion 7 is disposed forward of the one-way clutch 5. The tubular portion 7 is unitarily rotatable with the pinion gear 3. When described in detail, as illustrated in FIG. 4, the tubular portion 7 has a large diameter part 71, a small diameter part 72 and a rear plate part 73. Each of the large diameter part 71 and the small diameter part 72 has a cylindrical shape. The outer diameter of the large diameter part 71 is greater than that of the small diameter part 72. It should be noted that the inner diameter of the large diameter part 71 is also greater than that of the small diameter part 72. The large diameter part 71 and the small diameter part 72 cover the outer peripheral surface of the boss part 113.

The rear plate part 73 has a disc shape and closes the rear end surface of the small diameter part 72. The rear plate part 73 has an opening in the center thereof and enables the pinion gear 3 to penetrate through the opening. The rear plate part 73 is interposed between the boss part 113 and the inner race 51 in the axial direction. As a result, the tubular portion 7 is unitarily rotated with the rotor 11 and the inner race 51. In other words, the tubular portion 7 is unitarily rotated with the pinion gear 3. The front surface of the rear plate part 73 contacts the rear surface of the boss part 113, whereas the rear surface of the rear plate part 73 contacts the front surface of the inner race 51.

The outer peripheral surface of the tubular portion 7 has water-repellent properties. For example, a waterproof layer is formed on the outer peripheral surface of the tubular portion 7. For example, a material with water-repellent properties (e.g., fluorine based resin or silicone resin) is applied to the outer peripheral surface of the tubular portion 7. It should be noted that the tubular portion 7 may be itself made of a material with water-repellent properties.

As illustrated in FIG. 3, the first seal member 8 is disposed forward of the one-way clutch 5 and prevents intrusion of water into the one-way clutch 5. When described in detail, the first seal member 8 is configured to seal the clearance produced between the lid member 6 and the tubular portion 7.

As illustrated in FIG. 4, the first seal member 8 has an annular share. A second inner peripheral surface 81 of the first seal member 8 is disposed with a gap from the outer peripheral surface of the tubular portion 7. The second inner peripheral surface 81 faces the outer peripheral surface of the tubular portion 7. In detail, the second inner peripheral surface 81 is disposed with a gap from the outer peripheral surface of the small diameter part 72 of the tubular portion 7. The second inner peripheral surface 81 faces the outer peripheral surface of the small diameter part 72 of the tubular portion 7.

The gap between the second inner peripheral surface 81 and the outer peripheral surface of the tubular portion 7 is preferably roughly in a range of greater than or equal to 0.05 mm and less than or equal to 0.3 mm, and is more preferably roughly in a range of greater than or equal to 0.1 mm and less than or equal to 0.2 mm. A boundary region between the second inner peripheral surface 81 and the outer peripheral surface of the small diameter part 72 of the tubular portion 7 is referred to as a first boundary region. It should be noted that in the present exemplary embodiment, the first boundary region indicates a space between the second inner peripheral surface 81 and the outer peripheral surface of the small diameter part 72 of the tubular portion 7.

The first seal member 8 is made from an elastic material such as synthetic rubber. When described in detail, the first seal member 8 has a first body 82 and a first lip part 83. it should be noted that the first body 32 and the first lip part 83 are integrally formed.

The first body 82 has an annular shape. The first body 82 is disposed on the front surface of the inner peripheral end of the lid part 62 of the lid member 6. When described in detail, the inner peripheral end of the lid part 62 is backwardly recessed and is formed as a recess 621. The first body 82 is disposed in the recess 621. It should be noted that the first body 82 has a thickness (i.e., an axial length) greater than the depth of the recess 621 of the lid part 62. Further, the first body 82 is axially interposed between the lid part 62 and a second body 92 to be described. Thus, the first seal member 8 is supported on the lid member 6.

The first lip part 83 has an annular shape and has a thickness gradually reducing to the inner peripheral side. The first lip part 83 is located on the inner peripheral end of the first seal member 8. The first lip part 83 forwardly tilts to the inner peripheral side. The inner peripheral end surface of the first lip part 83 corresponds to the aforementioned second inner peripheral surface 81.

The second inner peripheral surface 81 of the first seal member 8 has water-repellent properties. When described in detail, a waterproof layer is formed on the second inner peripheral surface 81. For example, a material with water-repellent properties (e.g., fluorine based resin or silicone resin) is applied to the second inner peripheral surface 81. It should be noted that the first seal member 8 may be itself made of a material with water-repellent properties.

The second seal member 9 is disposed forward of the first seal member 8 and prevents intrusion of water into the one-way clutch 5. When described in detail, the second seal member 9 has an annular shape. Further, the second seal member 9 is disposed forward of the first seal member 8 so as to extend from the lid member 6 toward the tubular portion 7. The second seal member 9 is configured to press the first seal member 8 onto the lid member 6 from front.

The second seal member 9 has a first inner peripheral surface 91. The first inner peripheral surface 91 is disposed with a gap from the outer peripheral surface of the tubular portion 7. The first inner peripheral surface 91 faces the outer peripheral surface of the tubular portion 7. It should be noted that the first inner peripheral surface 91 is disposed with a gap from the outer peripheral surface of the large diameter part 71 of the tubular portion 7. The first inner peripheral surface 91 faces the outer peripheral surface of the large diameter part 71 of the tubular portion 7.

The second seal member 9 is disposed so as to be non-rotatable about the spool shaft 2. For example, the second seal member 9 is fixed to the reel body 1 by screw members or so forth. Further, the second seal member 9 is disposed on the front surface of the lid member 6.

The second seal member 9 has the second body 92 and a protruding part 93. The second body 92 has a disc shape and has an opening in the center thereof. The inner peripheral surface of the opening of the second seal member 9 corresponds to the aforementioned first inner peripheral surface 91.

The gap between the first inner peripheral surface 91 and the outer peripheral surface of the tubular portion 7 is preferably roughly in a range of greater than or equal to 0.05 mm and less than or equal to 0.3 mm and is more preferably roughly a range of greater than or equal to 0.1 mm and less than or equal to 0.2 mm. Further, the axial length of the first inner peripheral surface 91 is greater than the distance between the first inner peripheral surface 91 and the outer peripheral surface of the large diameter part 71 of the tubular portion 7. Yet further, a boundary region between the first inner peripheral surface 91 and the outer peripheral surface of the large diameter part 71 of the tubular portion 7 is referred to as a second boundary region. It should be noted that in the present exemplary embodiment, the second boundary region indicates a space produced between the first inner peripheral surface 91 and the outer peripheral surface of the large diameter part 71 of the tubular portion 7. It should be noted that the radial position of the first boundary region is different from that of the second boundary region. Specifically, the first boundary region is located radially inward of the second boundary region.

The first inner peripheral surface 91 of the second seal member 9 has water-repellent properties. When described in detail, a waterproof layer is formed on the first inner peripheral surface 91. For example, a material with water-repellent properties (e.g., fluorine based resin or silicone resin) is applied to the first inner peripheral surface 91. It should be noted that the second seal member 9 may be itself made of a material with water-repellent properties.

The protruding part 93 forwardly protrudes from the inner peripheral end of the second body 92. The protruding part 93 is formed on the entire circumference of the inner peripheral end of the second body 92. Specifically, the protruding part 93 has a cylindrical shape. The inner peripheral surface of the protruding part 93 composes a part of the first inner peripheral surface 91. The height of the protruding part 93 is preferably set to be roughly in a range of greater than or equal to 1.0 mm and less than or equal to 1.5 mm and is more preferably set to be roughly 1.2 mm.

<Features>

The spinning reel according to the present exemplary embodiment has the following features.

In The spinning reel 100 according to the present exemplary embodiment, intrusion of water into the one-way clutch 5 is prevented not only by the first seal member 8 but also by the second seal member 9. Hence, intrusion of water into the one-way clutch 5 can be further reliably prevented. Moreover, the first inner peripheral surface 91 of the second seal member 9 is disposed with a gap from the outer peripheral surface of the tubular portion 7. Hence, the tubular portion 7 rotates smoothly without being hindered from rotating by the second seal member 9. As a result, the pinion gear 3 also rotates smoothly. Furthermore, the first inner peripheral surface 91 of the second seal member 9 and the outer peripheral surface of the tubular portion 7 have water-repellent properties. Thus, it is possible to prohibit the intrusion of water or so forth into the on-way clutch 5 through the clearance between the first inner peripheral surface 91 of the second seal member 9 and the outer peripheral surface of the tubular portion 7.

<Modifications>

One exemplary embodiment of the present invention has been described above. However, the present invention is not limited to the aforementioned exemplary embodiment, and a variety of changes can be made without departing from the scope of the present invention.

Modification 1

Figure 5:
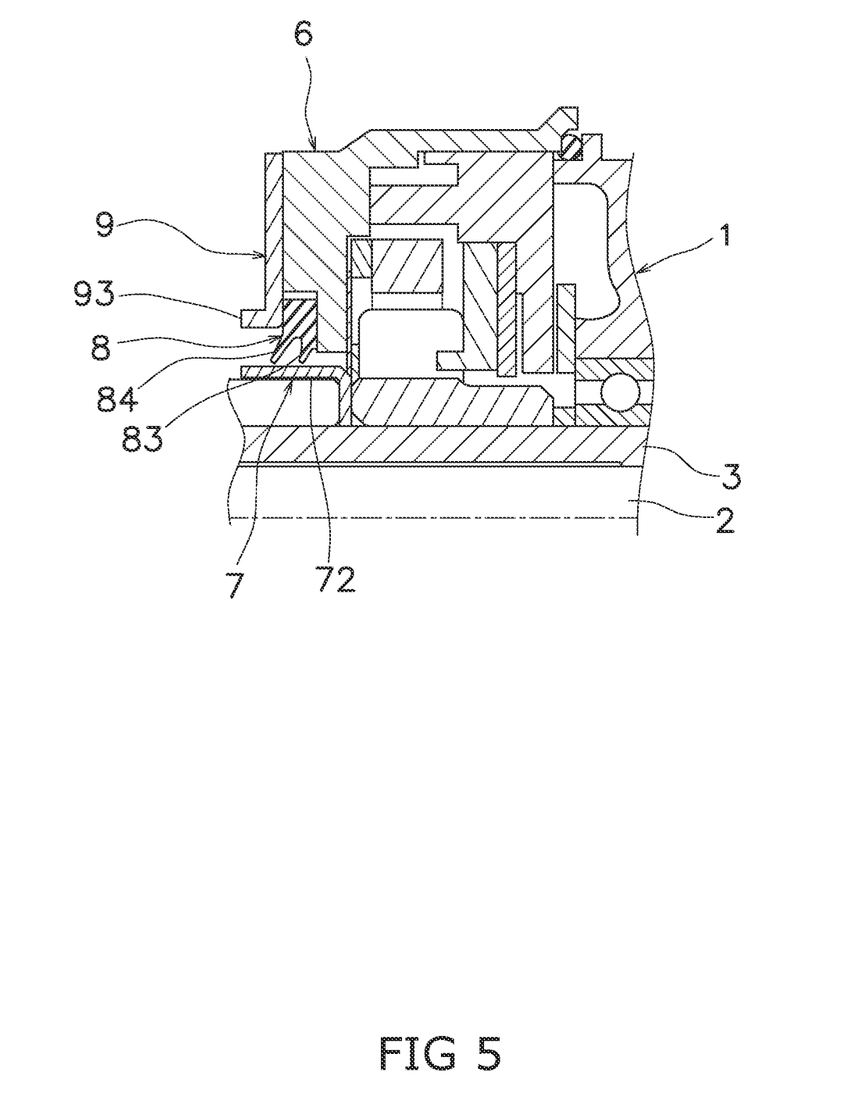
FIG. 5 is an enlarged cross-sectional view of a spinning reel according to a modification 1.

As illustrated in FIG. 5, the first seal member 8 further has a second lip part 84 with a thickness gradually reducing to the inner peripheral side. The second lip part 84 is located forward of the first lip part 83. The second lip part 84 has an annular shape and is located on the inner peripheral end of the first seal member 8. The second lip part 84 forwardly tilts to the inner peripheral side. The inner peripheral surface of the second lip part 84 may be located at a gap from the outer peripheral surface of the tubular portion 7, and further or alternatively may have water-repellent. properties. On the other hand, the tubular portion 7 may not have the large diameter part 71.

Modification 2

In the aforementioned exemplary embodiment, the accommodation member 4 and the reel body 1 are separately formed as discrete members. However, the present invention is not particularly limited to the structure. For example, the accommodation member 4 may be integrally formed with the reel body 1. In other words, the reel body 1 and the accommodation member 4 may be formed as a single member.

Modification 3

In the aforementioned exemplary embodiment, the second seal member 9 has the protruding part 93. However, the present invention is not particularly limited to the structure. For example, the second seal member 9 is not required. to have the protruding part 93.

Modification 4

In the aforementioned exemplary embodiment, the second inner peripheral surface 81 of the first seal member 8 is disposed with a gap from the peripheral surface of the tubular portion 7. However, the present invention is not particularly limited to the structure. For example, the second inner peripheral surface 81 of the first seal member 8 may contact the outer peripheral surface of the tubular portion Modification 5

In the aforementioned exemplary embodiment, the first inner peripheral surface 91, the second inner peripheral surface 81 and the outer peripheral surface of the tubular portion 7 have water-repellent properties. However, the present invention is not particularly limited to the structure. For example, when the outer peripheral surface of the tubular portion 7 has water-repellent properties, the first inner peripheral surface 91 and the second inner peripheral surface 82 may not have water-repellent properties. Contrarily, when the first inner peripheral surface 91 and the second inner peripheral surface 81 have water-repellent properties, the outer peripheral surface of the tubular portion 7 may not have water-repellent properties.

Modification 6

Figure 6:
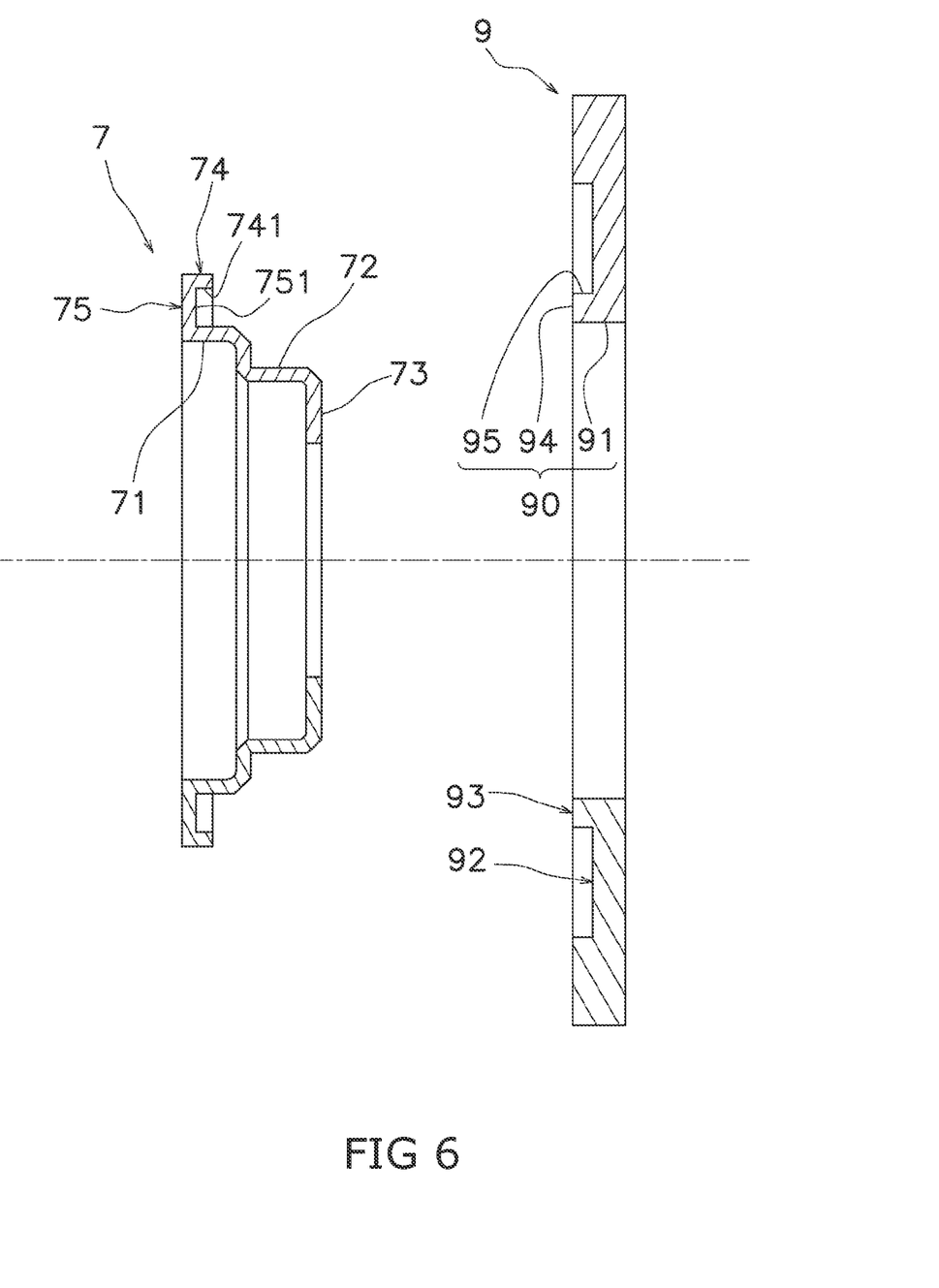
FIG. 6 is an exploded view of a tubular portion and a second seal member according to a modification 6.

As illustrated in FIG. 6, the tubular portion 7 according to a modification 6 further has an outer tubular part 74 and a coupling part 75. The outer tubular part 74 has a cylindrical shape and is disposed radially outward of the large diameter part 71. When considered as a single component, the tubular portion 7 has a structure that the inner peripheral, surface of the outer tubular part 74 faces the outer peripheral surface of the large diameter part 71.

The coupling part 75 couples the large diameter part 71 and the outer tubular part 74. When described in detail, the coupling part 75 has an annular shape. The inner peripheral end of the coupling part 75 is joined to the front end of the large diameter part 71. The outer peripheral end of the coupling part 75 is joined to the front end of the outer tubular part 74. A rear surface 751 of the coupling part 75 corresponds to the rear surface of the rotary member of the present invention.

The outer peripheral surface of the large diameter part 71, the outer peripheral surface of the small diameter part 72, an inner peripheral surface 741 of the outer tubular part 74 and the rear surface 751 of the coupling part 75 have water-repellent properties. For example, a waterproof layer is formed on each of the surfaces. For example, a material with water-repellent properties (e.g., fluorine based resin or silicone resin) is applied to each of the surfaces. It should be noted that the tubular portion 7 may be itself made from a material with water-repellent properties.

The second seal member 9 is disposed with a gap from the tubular portion 7. In other words, the second seal member 9 has a facing surface 90 disposed with a gap from the tubular portion 7. The facing surface 90 faces the tubular portion 7. The facing surface 90 of the second seal member 9 has the first inner peripheral surface 91, a first facing surface 94 and a second facing surface 95.

The first inner peripheral surface 91 is disposed with a gap from the outer peripheral surface of the tubular portion 7. The first inner peripheral surface 91 faces the outer peripheral surface of the tubular portion 7. When described in detail, the first inner peripheral surface 91 is disposed with a gap from the outer peripheral surface of the large diameter part 71 of the tubular portion 7. The first inner peripheral surface 91 faces the outer peripheral surface of the large diameter part 71 of the tubular portion 7. The first inner peripheral surface 91 extends along the axial direction. A first clearance is defined by the first inner peripheral surface 91 and the outer peripheral surface of the large diameter part 71. The first clearance extends along the axial direction.

The first facing surface 94 extends in a different direction from the first inner peripheral surface 91. When described in detail, the first facing surface 94 extends along the radial direction. It should be noted that the first facing surface 94 is composed of the front surface of the inner peripheral end of the second seal member 9. Specifically, the first facing surface 94 is composed of the front surface of the protruding part 93. The first facing surface 94 is disposed with a gap from the rear surface 751 of the tubular portion 7. The first facing surface 94 faces the rear surface 751 of the tubular portion 7. The gap between the first facing surface 94 and the rear surface 751 of the tubular portion 7 is preferably set to be roughly in a range of greater than or equal to 0.05 mm and less than or equal to 0.3 mm, and is more preferably set to be roughly in a range of greater than or equal to 0.1 mm and less than or equal to 0.2 mm.

A second clearance is defined by the first facing surface 94 and the rear surface 751 of the tubular portion 7. The second clearance is communicated with the aforementioned first clearance and extends along the radial direction. Specifically, the second clearance extends from the front end of the first clearance to the radially outward. Thus, a labyrinth structure is formed by the first clearance and the second clearance.

The second facing surface 95 extends in a different direction from the first facing surface 94. When described in detail, the second facing surface 95 extends along the axial direction. It should be noted that the second facing surface 95 is composed of the outer peripheral surface of the protruding part 93. The second facing surface 95 is disposed with a gap from the inner peripheral surface 741 of the tubular portion 7. The second facing surface 95 faces the inner peripheral surface 741 of the tubular portion 7. The gap between the second facing surface 95 and the inner peripheral surface 741 of the tubular portion 7 is preferably set to be roughly in a range of greater than or equal to 0.05 mm and less than or equal to 0.3 mm, and is more preferably set to be roughly in a range of greater than or equal to 0.1 mm and less than or equal to 0.2 mm.

A third clearance is defined by the second facing surface 95 and the inner peripheral surface 741 of the tubular portion 7. The third clearance is communicated with the second clearance and extends along the axial direction. Specifically, the third clearance backwardly extends from the outer peripheral end of the second clearance. Thus, a labyrinth structure is formed by the first clearance, the second clearance and the third clearance.

The first inner peripheral surface 91, the first facing surface 94 and the second facing surface 95 have water-repellent properties. When described in detail, a waterproof layer is formed on each of the first inner peripheral surface 91, the first facing surface 94 and the second facing surface 95. For example, a material with water-repellent properties (e.g., fluorine based resin or silicone resin) is applied to the first inner peripheral surface 91, the first facing surface 94 and The second facing surface 95. It should be noted that the second seal member 9 may be itself made of a material with water-repellent properties.

What is claimed is:
1. A spinning reel configured to forwardly reel out a fishing line, comprising:
  a reel body;
  a spool shaft mounted to the reel body;
  a rotary member including a pinion gear, the pinion gear being mounted to the reel body and being disposed so as to be rotatable about the spool shaft;
  a one-way clutch configured to transmit rotation in one direction between the reel body and the pinion gear;
  a first seal member disposed forwardly of the one-way clutch so as to prevent water intrusion into the one-way clutch; and
  a second seal member disposed forwardly of the first seal member so as to prevent water intrusion into the one-way clutch and having a first inner peripheral surface, the first inner peripheral surface being disposed with a gap from an outer peripheral surface of the rotary member, the first inner peripheral surface facing the outer peripheral surface of the rotary member,
  at least one of the first inner peripheral surface and the outer peripheral surface of the rotary member having water-repellent properties.

2. The spinning reel according to claim 1, wherein
the rotary member includes a tubular portion configured to be unitarily rotated with the pinion gear,
an outer peripheral surface of the tubular portion faces the first inner peripheral surface, and
at least one of the outer peripheral surface of the tubular portion and the first inner peripheral surface has water-repellent properties.

3. The spinning reel according to claim 1, wherein
the first seal member has a second inner peripheral surface disposed with a gap from the outer peripheral surface of the rotary member, the second inner peripheral surface facing the outer peripheral surface of the rotary member, and
at least one of the second inner peripheral surface and the outer peripheral surface of the rotary member has water-repellent properties.

4. The spinning reel according to claim 3, wherein
the second inner peripheral surface of the first seal member and the outer peripheral surface of the rotary member define a first boundary region therebetween, the first inner peripheral surface and the outer peripheral surface of the rotary member define a second boundary region therebetween, and the first boundary region is located in a different radial position from the second boundary region.

5. The spinning reel according to claim 4, wherein
the first boundary region is located radially inward of the second boundary region.

6. The spinning reel according to claim 1, wherein
the first seal member has an annular shape, and
the first seal member has a first lip part with a thickness gradually reducing to an inner peripheral side.

7. The spinning reel according to claim 6, wherein
the first seal member includes a second lip part with a thickness gradually reducing to the inner peripheral side.

8. The spinning reel according to claim 1, further comprising:
  an accommodation member having an accommodation space and being fixed to the reel body, the accommodation space being opened in a forward direction,
  the one-way clutch being disposed within the accommodation space.

9. The spinning reel according to claim 8, wherein
the accommodation member is integral with the reel body.

10. The spinning reel according to claim 8, further comprising:
  a lid member having a third inner peripheral surface and disposed forwardly of the accommodation member, the third inner peripheral surface being disposed with a gap from the outer peripheral surface of the rotary member and facing the outer peripheral surface of the rotary member, the first seal member being configured to seal the gap between the lid member and the rotary member.

11. The spinning reel according to claim 1, wherein the second seal member has a protruding part, the protruding part protruding forwardly and being disposed on an entire circumference of an inner peripheral end of the second seal member.

12. The spinning reel according to claim 1, wherein the second seal member is configured to press the first seal member from a forward direction.

13. The spinning reel according to claim 1, wherein the second seal member has a first facing surface, the first facing surface extending in a different direction from the first inner peripheral surface, the first facing surface being disposed with a gap from the rotary member and facing the rotary member.

14. The spinning reel according to claim 13, wherein the first inner peripheral surface extends along a rotary axis direction of the rotary member, and the first facing surface extends along a radial direction of the rotary member.

15. The spinning reel according to claim 13, wherein the first facing surface is formed by a front surface of an inner peripheral end of the second seal member, the first facing surface being disposed with a gap from a rear surface of the rotary member and facing the rear surface of the rotary member.

16. The spinning reel according to claim 13, wherein the second seal member has a second facing surface extending in a different direction from the first facing surface.

17. The spinning reel according to claim 16, wherein the second facing surface extends in a rotary axis direction of the rotary member.

18. The spinning reel according to claim 1, wherein the at least one of the first inner peripheral surface and the outer peripheral surface of the rotary member includes a water proof layer formed from at least one of a fluorine based resin or a silicone resin.

* * * * *